No. 794,581.

Patented July 11, 1905.

UNITED STATES PATENT OFFICE.

DAVID BACHRACH, OF BALTIMORE, MARYLAND.

MAKING COMPOUNDS OF NITROCELLULOSE OR SIMILAR SUBSTANCES.

SPECIFICATION forming part of Letters Patent No. 794,581, dated July 11, 1905.

Application filed January 16, 1904. Serial No. 189,286.

*To all whom it may concern:*

Be it known that I, DAVID BACHRACH, a citizen of the United States, residing at the city of Baltimore, in the State of Maryland, have invented certain new and useful Improvements in Making Compounds of Nitrocellulose or Similar Substances Used in the Arts, Non-Inflammable or Slowly Inflammable, of which the following is a specification.

I have discovered that when silicic acid can be incorporated with compounds of nitrocellulose and similar substances in the most intimate manner and in a state of the finest subdivision it will make these substances almost totally non-inflammable; but in all the methods so far devised, which simply unite silicic acid or its salts by mechanical mixture, such a result is not obtained. I have found that the most effective way to accomplish the object is to form the silicic acid in the compound by the reaction of sulfuric acid or any acid that will free the silicic acid from its salts and from the volatile non-aqueous liquid silicates, which I have found specially well adapted for this purpose, those at present known being the silicates of methyl, ethyl, and amyl, otherwise called "silicic esters." It is well understood that the silicates in aqueous solution, such as sodium and potassium, cannot be used in such compounds on account of the water and of the soluble salts formed by the reactions, which would precipitate the pyroxylin, rendering necessary the washing, drying, and redissolving of the mass, and even then it is but very partially effective in taking away the great inflammability of the compound. The most complete results are obtained, so far as non-inflammability is concerned, by the use of an acid with the silicic volatile liquids mentioned to form the silicic acid by reaction and then using an antacid, like carbonate of lime, as an addition to neutralize the free acid other than silicic acid formed in the compound, as described in Specification No. 667,759, February 12, 1901, or using an absorbent, like sulfate of lime, to retain the free acid in an inert or harmless manner, as described in Specification No. 743,422, November 9, 1903. In either case these additions are to take place after thorough mixture of the other ingredients to form the compound. I also use dry silicic salts, such as silicate of calcium in fine powder, and an acid (sulfuric preferred) to free the silicic acid, and in such case I proceed very much in the same way as described in my Letters Patent No. 743,422, November 9, 1903, and use about the same proportion of salt and acid. In any case where a dry silicate is used the proportion of acid should be just enough to free the silicic acid and no more.

When the non-aqueous liquid silicates I describe are used with an acid, the proportion should be about four ounces of the silicate of methyl to each ounce of pyroxylin, while a larger quantity of the ethyl and still larger of the amyl silicate is required, these latter not being as strong in silicic acid. These liquid silicates are to be added to the mixture of the pyroxylin, camphor, solvent, and acid after these latter have been thoroughly mixed and united. The proportions of solvent, pyroxylin, and camphor are in all processes the same, and the proportion of acid is in all cases dependent on the amount of the silicates, which can always be calculated by the methods well known in chemistry.

It will be found best not to use the full amount of acid necessary to convert all the volatile silicates in the compound into pure silica, as the mass allows of better handling by having the volatile silicates in excess.

As this is a compound of nitrocellulose which must be made into a mass without any precipitation of the pyroxylin, it is evident that none of the usual forms of silicate, such as silicate of sodium and potassium or any other of the salts soluble in water, can be used, nor such as by reaction with the acids used leave a soluble salt in the compound, and I disclaim the mixture of acid and silicates, which produces the colloid silicates, as they will not unite with nitrocellulose compounds properly. I use the silicate of calcium and such others as will produce an insoluble salt by reaction with the acid used. I also use the new volatile silicates of ethyl, methyl, and amyl, otherwise known as "silicic esters," which combine readily with the nitrocellulose compounds and which gives a combination absolutely new and not heretofore obtained.

What I claim is—

1. A non-inflammable or slow-burning compound of nitrocellulose and similar substances, produced by the addition to the usual constituents thereof the non-aqueous silicates of ethyl, methyl and amyl and similar silicates known as "silicic esters," and a free acid, substantially as described.

2. A non-inflammable or slow-burning compound of nitrocellulose containing free silica and free acid, formed by adding the silicic esters and acid, substantially as described.

3. The process of forming a non-inflammable or slow-burning compound of nitrocellulose, by the addition of free silicates, an acid and an absorbent, substantially as described.

DAVID BACHRACH.

Witnesses:
M. L. ROBINSON,
MARIE ECKHARDT.